US012655907B2

(12) United States Patent　　　　(10) Patent No.:　US 12,655,907 B2
Hoffner et al.　　　　　　　　　　　(45) Date of Patent:　　Jun. 16, 2026

(54) SEALING ARRANGEMENT WITH GROUNDING ELEMENT

(71) Applicant: Carl Freudenberg KG, Weinheim (DE)

(72) Inventors: Marc Hoffner, Dielheim (DE); Günter Hintenlang, Abtsteinach (DE); Jens Hofmann, Mannheim (DE)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 18/937,100

(22) Filed: Nov. 5, 2024

(65) Prior Publication Data

US 2025/0146577 A1　　May 8, 2025

(30) Foreign Application Priority Data

Nov. 7, 2023　(DE) ..................... 10 2023 130 792.4

(51) Int. Cl.
F16J 15/3284　　　(2016.01)
(52) U.S. Cl.
CPC ................................. F16J 15/3284 (2013.01)
(58) Field of Classification Search
CPC　F16J 15/3284; F16J 15/16; F16J 15/32; F16J 15/3204; F16J 15/3232
See application file for complete search history.

(56) References Cited

U.S. PATENT DOCUMENTS

| | | | | | |
|---|---|---|---|---|---|
| 3,924,861 | A | * | 12/1975 | Szepesvary | .......... F16J 15/3252 |
| | | | | | 277/553 |
| 4,132,421 | A | * | 1/1979 | Corsi | ..................... F16J 15/328 |
| | | | | | 277/575 |
| 6,666,459 | B1 | | 12/2003 | Hufnagel | |
| 11,359,724 | B2 | * | 6/2022 | Wagner | ................ F16J 15/3288 |
| 11,933,252 | B2 | * | 3/2024 | Eguchi | ................... F02M 26/11 |
| 2004/0169338 | A1 | * | 9/2004 | Hintenlang | .......... F16J 15/3268 |
| | | | | | 277/549 |

(Continued)

FOREIGN PATENT DOCUMENTS

| | | | | |
|---|---|---|---|---|
| CN | 115777047 | A | * | 3/2023 | ........... F16J 15/3284 |
| DE | 2825622 | A | | 1/1980 | |

(Continued)

*Primary Examiner* — Eugene G Byrd
(74) *Attorney, Agent, or Firm* — LEYDIG, VOIT & MAYER, LTD.

(57)　　　　　　ABSTRACT

A sealing arrangement for sealing a first region from a second, oil-filled region on a rotating component, including a sealing ring with a first sealing flange, a second sealing flange and a connecting region. The sealing arrangement includes a grounding element arranged on a rear side of the connecting region and that electrically connects the rotating component to a stationary housing. The sealing arrangement includes a gap seal arranged between the first sealing flange and the grounding element. A first space between the sealing ring and the gap seal provides a collecting space for oil from the second region. The gap seal maintains a gap to the rotating component ensuring protection of the grounding element from oil and supplying oil to the grounding element depending on a gap height to allow contact lubrication between the grounding element and the rotating component without functionally restricting electrical properties of the grounding element.

13 Claims, 6 Drawing Sheets

(56)         References Cited

U.S. PATENT DOCUMENTS

2014/0203514 A1 *  7/2014  Colineau ............. F16J 15/3284
                                                277/549
2016/0010750 A1 *  1/2016  Colineau ............. F16J 15/3232
                                                277/575
2022/0349477 A1    11/2022  Lindener et al.

FOREIGN PATENT DOCUMENTS

DE        19915467  A1    10/2000
DE       102013000982  A1     7/2014
DE       102013206578  A1    10/2014
DE       102014010269  A1     1/2016
DE       102019117016  A1    12/2020
EP        1916509  A1     4/2008
EP        2290271  A1     3/2011
EP        2924324  A1 *   9/2015  .......... F16J 15/3228
EP        2924324  B1     3/2017
EP        4191097  A1     6/2023
JP        S60175957  U    11/1985
JP        H0514739  U     2/1993
JP        200118186  A     1/2001

* cited by examiner

SEALING ARRANGEMENT WITH GROUNDING ELEMENT

CROSS REFERENCE TO RELATED APPLICATIONS

This application claims benefit to German Patent Application No. DE 10 2023 130 792.4, filed on Nov. 7, 2023, which is hereby incorporated by reference herein.

FIELD

The present invention relates to a sealing arrangement with a grounding element for sealing a first region, in particular an atmosphere, from a second, product region filled with oil and to an electrical arrangement having such a sealing arrangement.

BACKGROUND

Sealing arrangements are known from the prior art in various designs. Such sealing arrangements are used, for example, in rotating electrical machines with oil lubrication and oil cooling, where a machine housing on a shaft must be sealed against the environment. The rotating shaft must be electrically connected to a stationary component. Here, for example, DE 10 2013 000 982 A1 proposes to provide a sealing arrangement with a sealing ring and a pre-seal made of an electrically conductive material, wherein a dirt lip resting on the rotating component and forming a gap is arranged in the axial direction between the pre-seal and the sealing ring. The purpose of this dirt lip is to prevent dirt and particles from getting from the outside towards the sealing region on the sealing ring and thus into the oil-filled region. This design has proven itself in principle, but one problem is the relatively short service life of the grounding element. The short service life is due to the fact that the seal allows very small quantities of oil to pass through, such as evaporating gap fluid. This is absorbed by the grounding element and prevents the electrical connection.

SUMMARY

In an embodiment, the present disclosure provides a sealing arrangement for sealing a first region from a second, oil-filled region on a rotating component, comprising a sealing ring made of an elastic material with a first sealing flange, a second sealing flange and a connecting region, wherein the connecting region connects the first sealing flange to the second sealing flange and has a front side directed towards the second region. The sealing arrangement further comprises a grounding element which is arranged on a rear side of the connecting region and is configured to electrically connect the rotating component to a stationary housing component. The sealing arrangement further comprises a gap seal which is arranged in an axial direction between a sealing contact of the first sealing flange on the rotating component and the grounding element, so that a first space is formed between the sealing ring and the gap seal in order to provide a collecting space for oil or oil mist from the second region. The gap seal is configured to maintain a gap to the rotating component in such a way as to ensure protection of the grounding element from oil contamination and to supply oil or oil mist to the grounding element in a defined manner depending on a gap height of the gap in order to allow contact lubrication between the grounding element and the rotating component without functionally restricting the electrical properties of the grounding element.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 1-8 are schematic sectional views of a sealing arrangement in accordance with embodiments of the invention.

DETAILED DESCRIPTION

Figure 3:
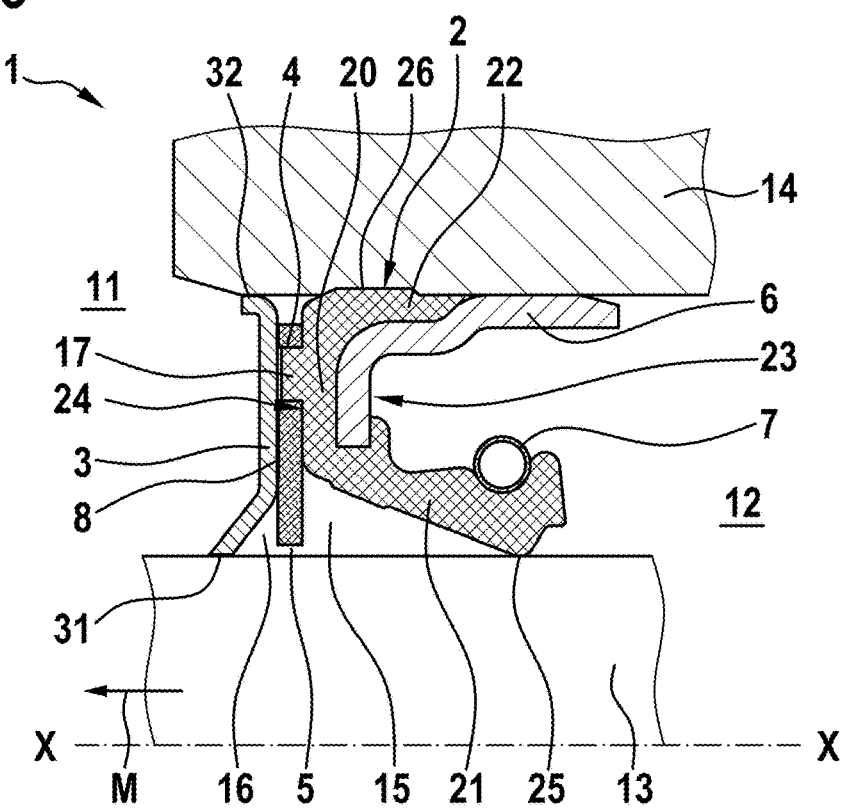

In an embodiment, a sealing arrangement with a grounding element and an electrical arrangement which has an improved function and service life while being simple in design and easy and cost-effective to manufacture is provided.

The sealing arrangements according to the present disclosure for sealing a first region from a second, oil-filled product region of a rotating component have the advantage that a grounding element has a significantly longer service life than previously in the prior art. The grounding element is made, for example, of an electrically conductive nonwoven material. Furthermore, a gap seal with a gap with a defined radial gap height is provided in the axial direction between an elastic sealing ring, which seals in a contacting manner on a rotating component, such as a shaft, and the grounding element, which gap seal ensures that the grounding element is protected from oil contamination and yet allows a defined small quantity of oil or oil mist to pass from the elastic sealing ring towards the grounding element. The radial gap height is preferably constant in the axial direction. If an excessive quantity of oil or oil mist were to reach the grounding element, the electrical properties of the grounding element could be limited and thus the electrical grounding function of the grounding element could be impaired. Thus, in a surprising way, oil or an oil mist, which can always to a certain extent pass through the elastic sealing ring towards the first region to be sealed, is used to extend the service life of the grounding element. The gap seal ensures that not too much oil or oil mist can reach the grounding element and negatively affect its electrically conductive properties, but that a slight contact lubrication with oil is present between the grounding element and the rotating component.

This is achieved according to the present disclosure in that the sealing arrangement has an elastic, annular sealing ring made of an elastic material with a first and a second sealing flange, which are connected to one another via a substantially radially extending connecting region. The connecting region has a front side directed towards the oil-filled product region (second region) and a rear side arranged on the opposite side, which is directed towards the first region. The grounding element is arranged on the rear side of the connecting region and is designed to electrically connect the rotating component to a stationary housing part and thus ensure potential equalization. The gap seal is arranged in the axial direction between the first sealing flange, which rests on the rotating component, and the grounding element, so that a first space is formed between the sealing ring and the gap seal in order to provide a collecting space for oil or oil mist from the oil-filled region. Thus, the gap seal is designed to maintain a defined radial gap from the rotating component in order to substantially keep escaping oil or oil mist away from the grounding element via the defined gap and to supply only a small part through the defined gap to the grounding element. The gap seal therefore has the primary task of keeping oil or oil mist away from the grounding element. Thus, the gap seal can prevent the grounding element from becoming oily, so that no functional restrictions on the electrical properties of the grounding element occur due to oil or oil mist. Nevertheless, a small quantity of oil defined by the gap seal may be present on the grounding element at a contact region of the grounding element with the rotating component, which does not significantly reduce the electrical conductivity of the grounding element, but can reduce friction between the grounding element and the rotating component during operation, thereby significantly reducing wear of the element according to the present disclosure.

The grounding element is preferably an electrically conductive nonwoven material or an electrically conductive element made of PTFE. The electrically conductive nonwoven material preferably has no absorbent properties.

Preferably, the grounding element has a substantially C-shaped or inverted C-shaped cross section. This makes it possible for the grounding element to have a large contact surface for electrical contact with both the rotating component and the housing component. Alternatively, the grounding element has an S-shaped or an inverted S-shaped cross section.

Preferably, the gap seal comprises a disk made of an absorbent nonwoven material, on the inner radius of which a gap in the gap seal is formed. This allows the gap seal itself to absorb oil, so that in the event that too much oil passes through the sealing ring towards the gap seal, the oil can be absorbed by the nonwoven material of the gap seal. If little or no oil reaches the gap seal in an operating state, the oil can also be released again. The oil can also be released towards of the grounding element if insufficient oil passes through the gap in the gap seal to lubricate the grounding element.

Preferably, a radial gap height of the gap in the gap seal is in a range of 0.01 mm to 0.50 mm, in particular 0.10 mm to 0.40 mm and further in particular 0.20 mm to 0.30 mm. The choice of the radial gap height defines a supply of oil to the grounding element. Depending on the application, a larger or smaller gap in the gap seal can be specified so that there is always a sufficient quantity of oil to lubricate the grounding element, but this quantity is so small that the electrical properties of the grounding element are not negatively affected. It should be noted that the gap seal should preferably also be designed in such a way that there is slight contact between the gap seal and the rotating component, since during operation, due to eccentricities, even with such a design, there is always a small radial gap between the gap seal and the rotating component.

Preferably, the gap seal is fixed between the grounding element and the rear side of the connecting region.

A particularly simple and cost-effective fixing of the grounding element to the sealing ring is achieved by means of an adhesive connection and/or a positive connection. If only a positive connection is used, it is advantageous that the grounding element can be easily separated from the sealing ring.

In order to allow a particularly secure fixation of the grounding element, the sealing arrangement further preferably comprises an electrically conductive metal sheet with which the grounding element is fixed to the sealing ring.

In accordance with an embodiment of the invention, the gap seal comprises an elastomer ring. Preferably, the elastomer ring of the gap seal and the sealing ring are made integrally and of the same material.

In accordance with an embodiment of the invention, the gap seal comprises a sheet metal part, wherein the gap between the gap seal and the rotating component is formed on an inner circumference of the sheet metal part. The sheet metal part can be manufactured in a simple manner by forming from a flat material. The sheet metal part further preferably has a collecting channel facing away from the gap, in which dirt particles or the like can be collected and thus cannot reach the grounding element and can greatly reduce the electrical conductivity.

More preferably, the sheet metal part is L-shaped in cross section. This results in a long gap in the gap seal in the axial direction.

In accordance with an embodiment of the invention, an additional protective lip is further formed on the sealing ring, which is arranged in the axial direction between the sealing contact of the sealing ring with the rotating component and the gap seal. The protective lip creates an additional collecting space between the protective lip and the gap seal, in which oil can be collected, which can enter the collecting space via the sealing contact with the rotating component, thus providing further protection of the grounding element against oil contamination. The protective lip has a further gap to the rotating component, which allows oil to pass in a defined manner from the additionally formed collecting space to the first space, which is now present between the protective lip and the gap seal. The gap in the gap seal is preferably smaller than the further gap in the protective lip. The protective lip is preferably made integrally and of the same material as the sealing ring. Preferably, the protective lip is made from an elastomer material at the same time as the sealing ring is manufactured.

Preferably, the sealing ring is made of an electrically non-conductive material.

Furthermore, the present disclosure relates to an electrical arrangement with a sealing arrangement according to the present disclosure for grounding a rotating component to a housing component.

Figure 1:
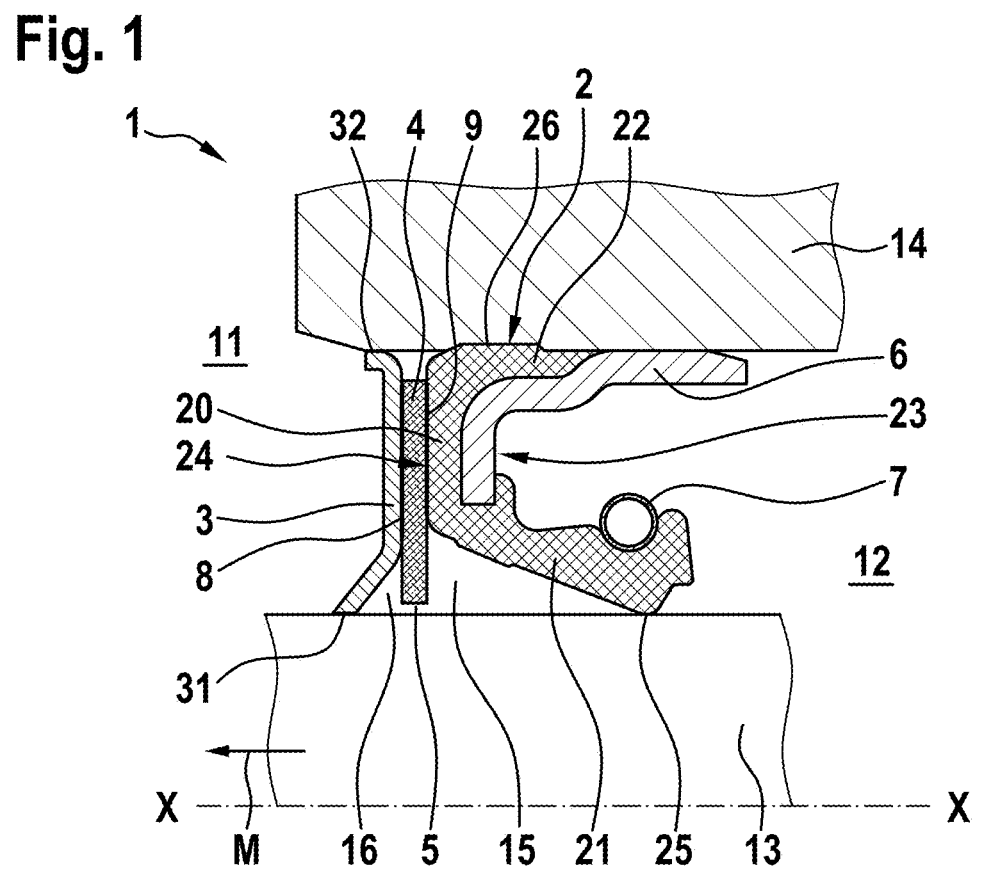

A sealing arrangement 1 in accordance with a first preferred embodiment of the invention is described in detail below with reference to FIG. 1.

As can be seen from FIG. 1, the sealing arrangement 1 comprises a sealing ring 2 made of an elastic material, preferably an elastomer.

The sealing ring 2 has a substantially C-shaped cross section with a first sealing flange 21 and a second sealing flange 22. The first sealing flange 21 is connected to the second sealing flange 22 via a substantially radially extending connecting region 20.

The sealing arrangement 1 seals a first region 11, e.g. an atmospheric region, from a second, oil-filled region 12. The second oil-filled region 12 is, for example, an oil-filled space of an electrical machine, wherein the oil serves as a cooling medium for the components of the electrical machine.

The first sealing flange 21 and the second sealing flange 22 are directed towards a front side 23 of the sealing ring 2. The sealing ring 2 seals at a first sealing contact 25 on a rotating component 13, in particular a shaft.

A second sealing contact 26 seals a stationary housing component 14.

The sealing ring 2 has a stiffening plate 6 for stiffening, which in particular allows stiffening of the second sealing flange 22. An annular spring 7 serves as a pre-stressing means for pre-stressing the second sealing flange 22 in order to obtain a secure seal at the first sealing contact 25.

The sealing arrangement 1 further comprises a grounding element 3 for electrical grounding. The grounding element 3 is a component made of an electrically conductive nonwoven material. The grounding element 3 is arranged on a rear side 24 of the connecting region 20 and is in contact with the rotating component 13 at a radially inner end and with the stationary housing component 14 at a radially outer end.

As can be seen from FIG. 1, the grounding element 3 is formed with a substantially inverted C-shaped cross section. At a contact 31 with the rotating component, the grounding element 3 forms a kind of lip. At a contact 32 with the stationary housing component 14, the grounding element 3 forms a surface contact of the housing component or, alternatively, a linear contact.

A gap seal 4 is arranged in the axial direction X-X between the grounding element 3 and the first sealing contact 25 of the sealing ring 2 on the rotating component 13. The gap seal 4 is preferably made of an absorbent nonwoven material. The absorbent nonwoven material does not have to be electrically conductive.

The gap seal 4 has a ring shape and is fixed to the sealing ring 2 in such a way that a radial gap 5 is present between a radially inner end of the gap seal 4 and the rotating component 13. A gap height of the gap 5 can be defined by selecting an inner diameter of the gap seal 4.

A first adhesive connection 8 is formed between the grounding element 3 and the gap seal 4, so that the grounding element 3 is glued to the gap seal 4. A second adhesive connection 9 is provided between the gap seal 4 and the sealing ring 2, so that the annular gap seal 4 is glued to the connecting region 20 of the sealing ring 2.

As can be seen from FIG. 1, the gap seal 4 divides a region on the rotating component 13 into a first space 15 between the sealing ring 2 and the gap seal and a second space 16 between the gap seal 4 and the grounding element 3.

The first space 15 now serves as a collecting space for oil or oil mist, which can reach the gap seal 4 via the first sealing contact 25. This keeps oil or oil mist away from the grounding element 3, so that oil contamination of the grounding element 3 can be avoided and the grounding element 3 retains its electrical properties, in particular its electrical conductivity.

The gap seal 4 is now designed to maintain the gap 5 to the rotating component 13 in order to be able to supply oil or oil mist, which can enter a first space 15 between the sealing ring 2 and the gap seal 4 via the first sealing contact 25, to the grounding element 3 in a defined manner. In particular, a supplied quantity can be defined by selecting the height of the gap 5. This allows oil to be provided to a certain extent for the tribological contact between the grounding element 3 and the rotating component 13, so that friction between the grounding element 3 and the rotating component 13 is reduced to a minimum. The quantity of oil allowed through the gap seal is so small that the electrical contact properties of the grounding element 3 with respect to the rotating component 13 are not impaired.

Since the gap seal 4 is made of an absorbent nonwoven material, excess quantities of oil which have entered a first space 15 and which pose a risk of entering a second space 16 via the gap 5 can be absorbed by the gap seal 4.

If an operating situation arises during operation in which oil is pumped back from the first space 15 via the sealing ring 2 into the second, oil-filled region 12, the gap seal 4 can also release oil again and this oil can be pumped into the second region 12 via the first sealing contact 25.

Depending on the respective operating situations, it should be noted that the sealing ring 2 can actually provide a secure seal on the rotating component 13 during operation, so that no visible oil can enter the first space 15 via the first sealing contact 25.

However, during operation there is also a form of uncontrolled evaporation of gap fluid (oil mist), which can enter the first space 15 via the first sealing contact 25. However, due to the electrically insulating properties of oil and deposits of oil components in the tribological friction contact on the dynamically contacted rotating component, this leakage, which is often not visible during operation, affects the electrical connection between the grounding element 3 and the rotating component 13 if too much evaporated oil can reach the grounding element 3.

By providing the gap seal 4 with a defined gap 5, the present disclosure can now ensure that only a quantity of oil that is harmless to the electrical properties of the grounding element 3 can reach the grounding element 3. The oil on the grounding element 3, which is supplied to the grounding element 3 in a defined quantity, also provides reduced friction between the grounding element 3 and the rotating component 13, so that a service life of the grounding element 3 can be significantly extended.

If too much evaporated oil can pass through the first sealing contact 25, the gap seal 4 serves as a safety element, which can additionally absorb excess oil or excess oil mist. Thus, in addition to the main protective function of the grounding element 3, the gap seal 4 also has a function of a defined supply of oil to the grounding element 3. In this way, a type of lubricant dosing can be achieved so that just enough oil is supplied to the grounding element 3 so that no excessive wear occurs during operation on the grounding element 3 at the contact 31.

Further preferred embodiments of the invention are described below with reference to FIG. 2 to 8, wherein like parts are designated by the same reference signs.

Figure 2:
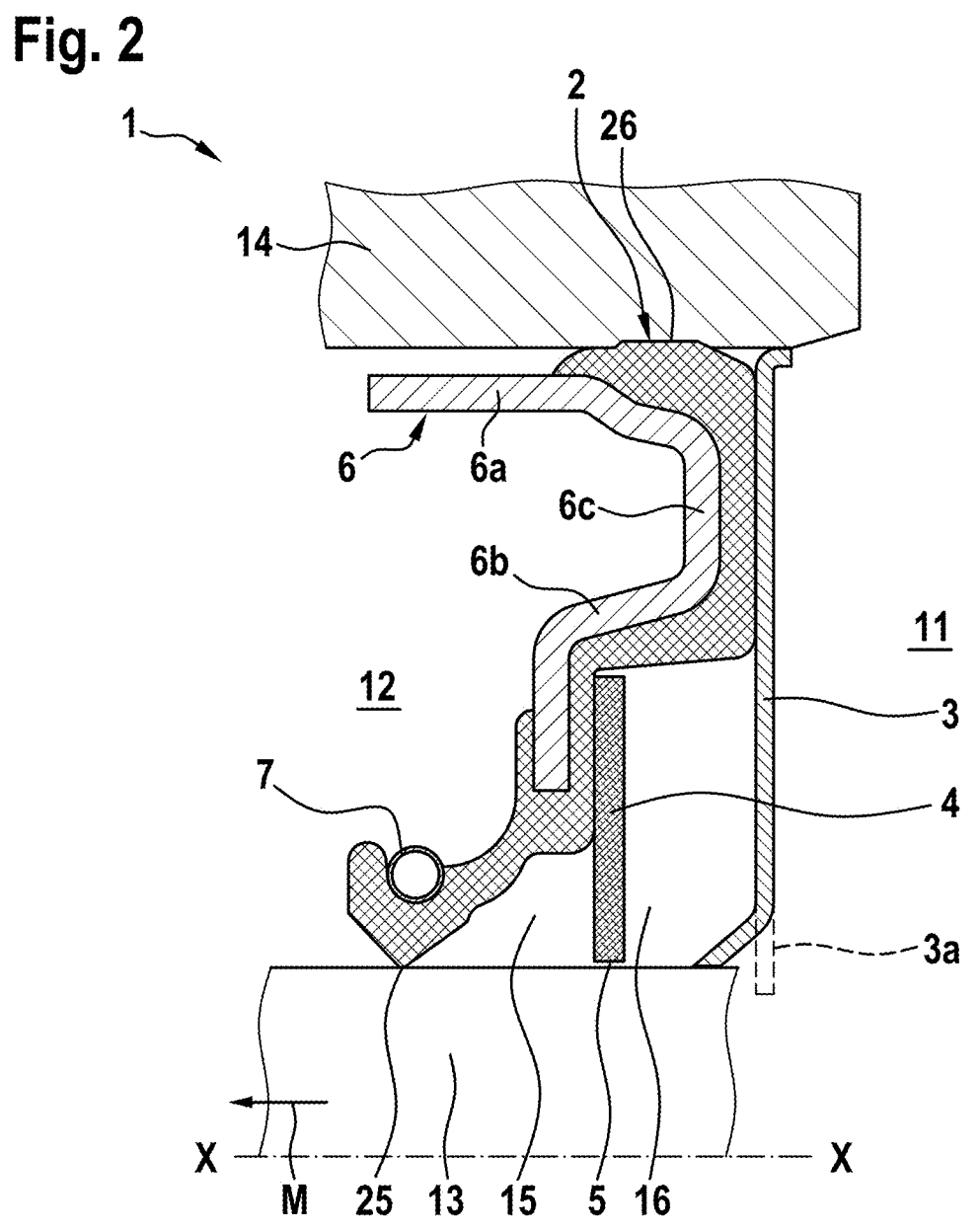

FIG. 2 shows a second embodiment of a sealing arrangement 1. In contrast to the first embodiment, in the second embodiment, the geometric shape of the stiffening plate 6 forms a relatively large first and second space 15, 16 in order to accommodate larger quantities of oil. As can be seen from FIG. 2, the stiffening plate 6 has a first leg 6a, a second leg 6b and a base region 6c. This creates an additional space radially inside the sealing ring 2, so that the first and second spaces 15, 16 can each be formed with a large volume. As can also be seen from FIG. 2, the gap seal 4 is arranged radially inside the two legs 6a, 6b of the stiffening plate. The gap seal is made of an absorbent nonwoven material. The grounding element 3 is also made of a nonwoven material, but of an electrically conductive nonwoven material without excessive absorption function, so that not too much oil can be absorbed by the nonwoven material of the grounding element 3. A radial end region 3a is also shown in dashed lines in FIG. 2. During assembly, as shown in FIG. 2, the shaft 13 is pushed in the direction of the assembly direction M, so that the radial end region 3a of the grounding element is shaped accordingly. As a result, in particular the radial end region 3a of the grounding element does not protrude in the direction of the first region 11.

In the third embodiment shown in FIG. 3, a positive connection 17 is provided between the gap seal 4 and the sealing ring 2. The sealing ring 2 has a protruding ring, preferably formed with an undercut, to which the gap seal 4 is positively fixed and on which it is centrally aligned. Instead of a circumferential ring, a plurality of individual button-like projections can also be provided on the sealing ring 2. The grounding element 3 is then again fixed to the gap seal 4 by means of the first adhesive connection 8.

Figure 4:
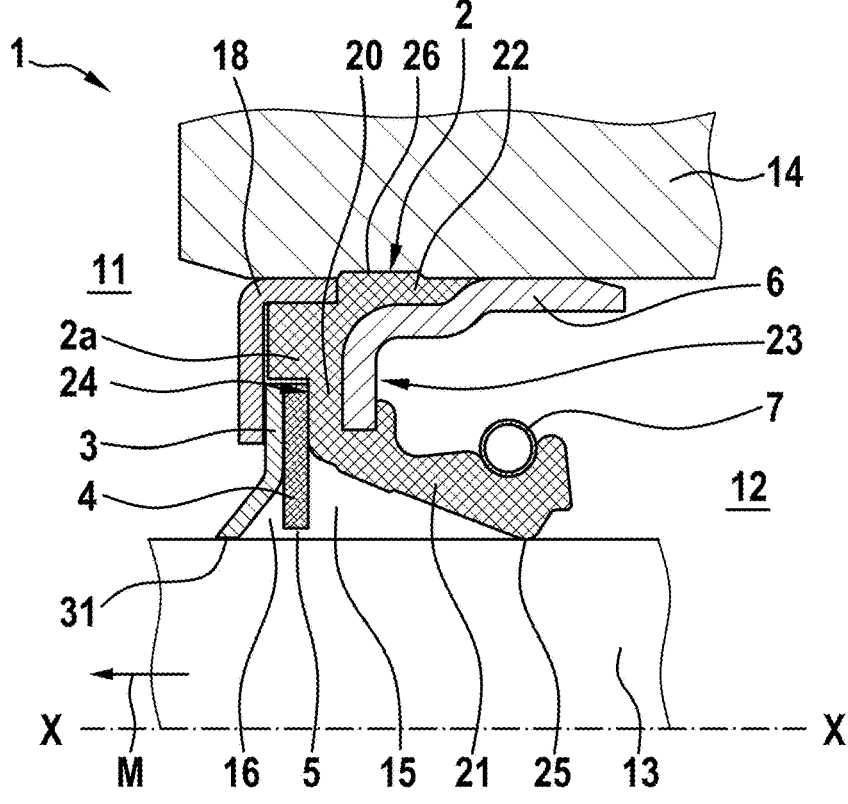

FIG. 4 shows a sealing arrangement 1 in accordance with a fourth embodiment of the invention. Similar to the third embodiment, a thickening 2a is provided on the rear side 24 of the sealing ring 2, wherein the thickening 2a covers the grounding element 3 and the gap seal 4 in the radial direction. In order to fix the grounding element 3, a metal sheet 18 is provided, which fixes the grounding element 3 and the gap seal 4 to the sealing ring 2. This can also be further reinforced by adhesive connections. The metal sheet 18 provides the electrical connection between the grounding element 3 and the stationary housing component 14. This embodiment in particular requires less nonwoven material for the grounding element 3 and the gap seal 4.

Figure 5:
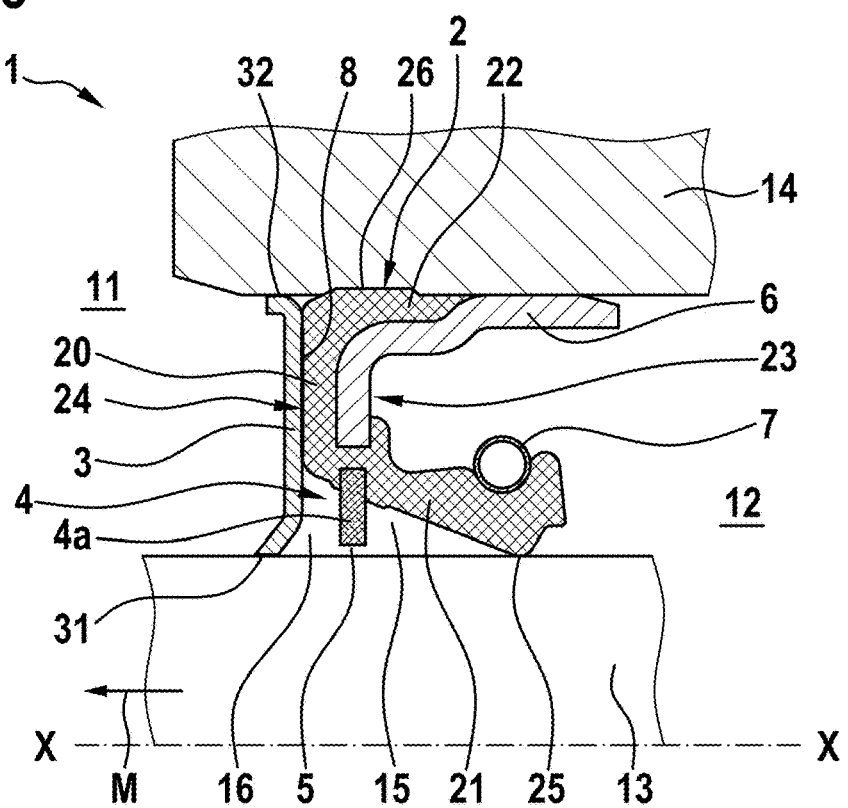

In the fifth embodiment shown in FIG. 5, the gap seal 4 comprises an elastomer ring 4a, which defines the gap 5 between the gap seal 4 and the rotating component 13. The elastomer ring 4a can be a separate component and fixed to the sealing ring 2 or alternatively the elastomer ring 4a is formed integrally with the sealing ring 2.

Figure 6:
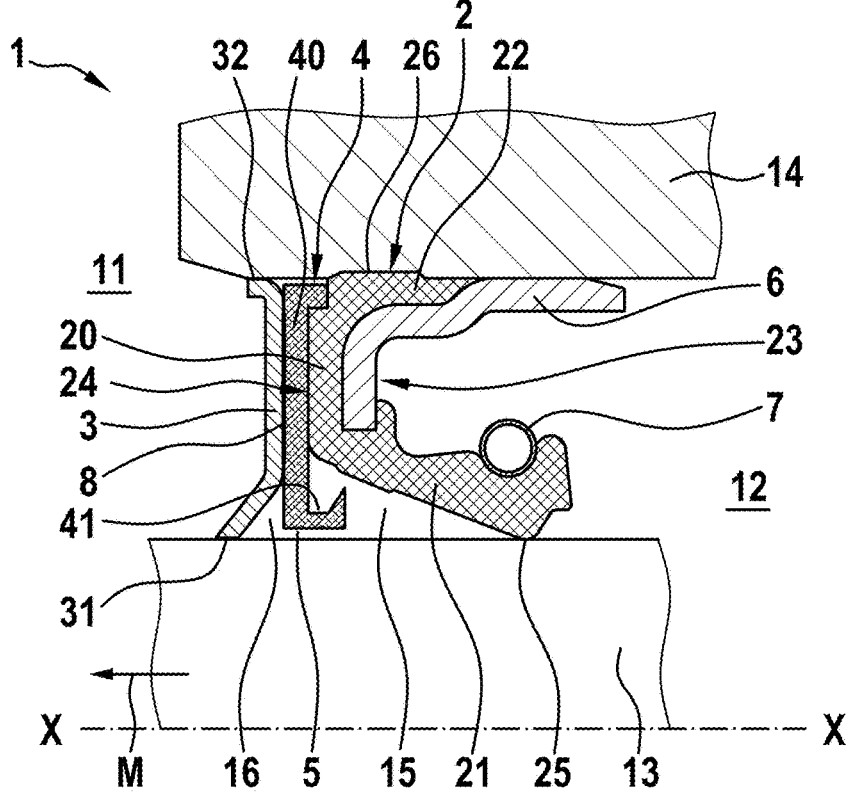
Figure 7:
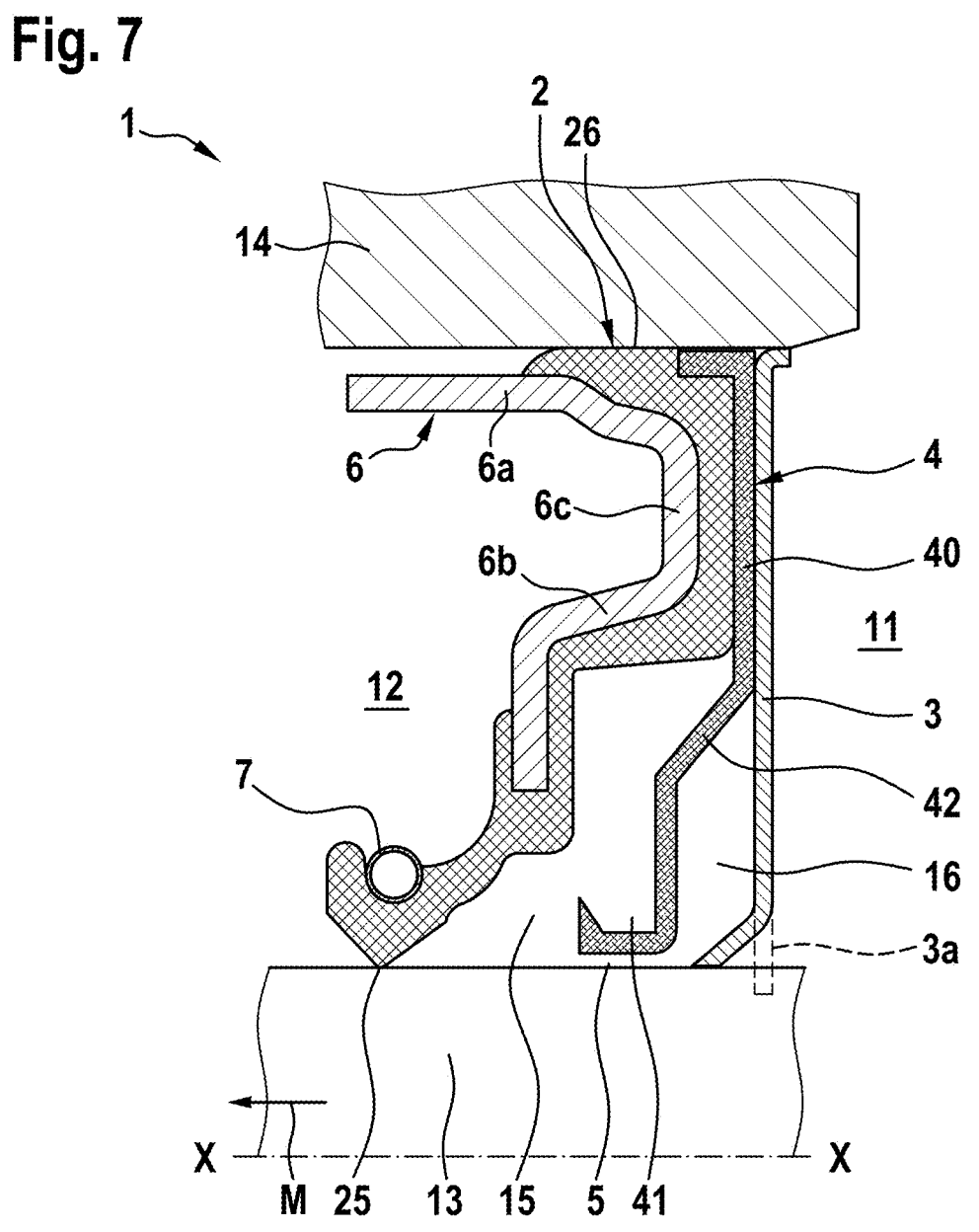

FIGS. 6 and 7 show a sixth and seventh embodiment of the invention, in which the gap seal 4 comprises a sheet metal part 40. As can be seen from FIG. 6, the sheet metal part 40 has a substantially L-shape and provides a collecting channel 41. This allows oil or oil mist to be collected and retained in the collecting channel 41 and not reach the grounding element 3. The sheet metal part 40 is preferably connected to the sealing ring 2 and the grounding element 3 via an adhesive connection.

The seventh embodiment shown in FIG. 7 substantially corresponds to the sixth embodiment, wherein the sheet metal part 40 also has a bend 42. This makes it easy to adjust the volume of the first space 15 and the second space 16 depending on the application (see FIG. 7).

Figure 8:
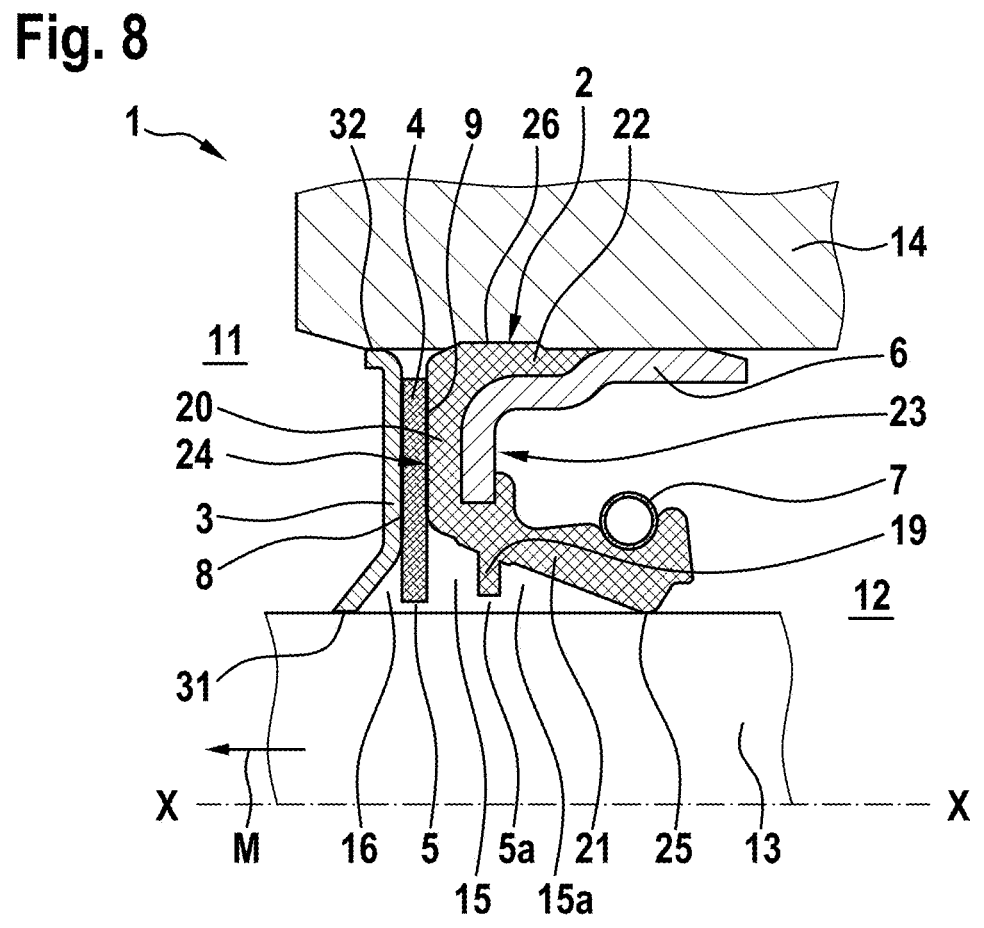

FIG. 8 shows an eighth embodiment of a sealing arrangement, which substantially corresponds to the first embodiment. In contrast to the first embodiment, the eighth embodiment additionally provides a protective lip 19. The protective lip 19 is arranged on the sealing ring 2 and forms a further gap 5a with the rotating component. As can be seen directly from FIG. 8, the provision of the protective lip 19 creates a further collecting space 15a for oil or oil mist. This results in a total of three spaces in series starting from the first sealing contact 25 to the grounding element 3. The further collecting space 15a is provided in the axial direction between the first sealing contact 25 and the protective lip 19. The first space 15 is formed in the axial direction between the protective lip 19 and the gap seal 4. The second space 16 is formed in the axial direction between the gap seal 4 and the grounding element 3.

A radial gap height of the further gap 5a in the protective lip 19 is greater than a radial gap height of the gap 5 at the gap seal 4. Thus, in the embodiment shown in FIG. 8, two gap seals are arranged in series on the rotating component. This results in a significant improvement in the retention of oil and oil mist in the direction of the grounding element. The protective lip 19 is made of the same material as the sealing ring 2 and is preferably formed integrally therewith. This provides further improved protection of the grounding element 3 against oil contamination without significantly increasing the manufacturing costs for the sealing ring 2.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A sealing arrangement for sealing a first region from a second, oil-filled region on a rotating component, comprising:

a sealing ring made of an elastic material with a first sealing flange, a second sealing flange and a connecting region, wherein the connecting region connects the first sealing flange to the second sealing flange and has a front side directed towards the second region;

a grounding element which is arranged on a rear side of the connecting region and is configured to electrically connect the rotating component to a stationary housing component; and a gap seal which is arranged in an axial direction between a sealing contact of the first sealing flange on the rotating component and the grounding element, so that a first space is formed between the sealing ring and the gap seal in order to provide a collecting space for oil or oil mist from the second region, wherein the gap seal is configured to maintain a gap to the rotating component in such a way as to ensure protection of the grounding element from oil contamination and to supply oil or oil mist to the grounding element in a defined manner depending on a gap height of the gap in order to allow contact lubrication between the grounding element and the rotating component without functionally restricting electrical properties of the grounding element, and wherein a protective lip is formed on the sealing ring, which is arranged in the axial direction between the sealing contact and the gap seal, so that a further collecting space is formed between the protective lip and the gap seal, and a further gap is arranged between the protective lip and the rotating component.

2. The sealing arrangement according to claim 1, wherein the grounding element has a substantially C-shaped cross section or inverted C-shaped cross section.

3. The sealing arrangement according to claim 1, wherein the gap seal comprises a disk made of an absorbent nonwoven material, on an inner radius of which the gap is formed.

4. The sealing arrangement according to claim 1, wherein a radial gap height of the gap is in a range of 0.01 mm to 0.50 mm.

5. The sealing arrangement according to claim 1, wherein the gap seal is fixed between the grounding element and the rear side of the connecting region.

6. The sealing arrangement according to claim 1, wherein an adhesive connection and/or a positive connection is formed between the grounding element and the gap seal and/or between the gap seal and the sealing ring.

7. The sealing arrangement according to claim 1, further comprising a metal sheet for fixing the grounding element to the sealing ring.

8. The sealing arrangement according to claim 1, wherein the gap seal comprises an elastomer ring which is fixed integrally with the sealing ring or as a separate component on the sealing ring.

9. A sealing arrangement for sealing a first region from a second, oil-filled region on a rotating component, comprising:

a sealing ring made of an elastic material with a first sealing flange, a second sealing flange and a connecting region, wherein the connecting region connects the first sealing flange to the second sealing flange and has a front side directed towards the second region;

a grounding element which is arranged on a rear side of the connecting region and is configured to electrically connect the rotating component to a stationary housing component; and a gap seal which is arranged in an axial direction between a sealing contact of the first sealing flange on the rotating component and the grounding element, so that a first space is formed between the sealing ring and the gap seal in order to provide a collecting space for oil or oil mist from the second region, wherein the gap seal is configured to maintain a gap to the rotating component in such a way as to ensure protection of the grounding element from oil contamination and to supply oil or oil mist to the grounding element in a defined manner depending on a gap height of the gap in order to allow contact lubrication between the grounding element and the rotating component without functionally restricting electrical properties of the grounding element, and wherein the gap seal further comprises a sheet metal part, the gap to the rotating component being formed on an inner circumference of the sheet metal part.

10. The sealing arrangement according to claim 9, wherein the sheet metal part has a collecting channel and/or wherein the sheet metal part is L-shaped in section.

11. The sealing arrangement according to claim 1, wherein the gap in the gap seal is smaller than the further gap in the protective lip.

12. The sealing arrangement according to claim 1, wherein the sealing ring is made of an electrically non-conductive material.

13. An oil-cooled electrical machine comprising the sealing arrangement according to claim 1.

\* \* \* \* \*